US009037905B2

(12) United States Patent
Sakurai et al.

(10) Patent No.: US 9,037,905 B2
(45) Date of Patent: May 19, 2015

(54) DATA PROCESSING FAILURE RECOVERY METHOD, SYSTEM AND PROGRAM

(75) Inventors: Takao Sakurai, Tokyo (JP); Masashi Egi, Machida (JP); Tsuneyuki Imaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 199 days.

(21) Appl. No.: 13/701,847

(22) PCT Filed: Aug. 24, 2010

(86) PCT No.: PCT/JP2010/064288

§ 371 (c)(1), (2), (4) Date: Dec. 4, 2012

(87) PCT Pub. No.: WO2011/158387

PCT Pub. Date: Dec. 22, 2011

(65) Prior Publication Data

US 2013/0086418 A1 Apr. 4, 2013

(30) Foreign Application Priority Data

Jun. 15, 2010 (JP) ................................ 2010-136099

(51) Int. Cl.
*G06F 11/14* (2006.01)

(52) U.S. Cl.
CPC ........ *G06F 11/1412* (2013.01); *G06F 11/1471* (2013.01); *G06F 11/1438* (2013.01); *G06F 11/1446* (2013.01); *G06F 11/1448* (2013.01); CPC *G06F 11/1469* (2013.01); *G06F 2201/84* (2013.01)

(58) Field of Classification Search
CPC ......................... G06F 11/1438; G06F 11/1471
USPC ..................................................... 714/15, 45
See application file for complete search history.

(56) References Cited

U.S. PATENT DOCUMENTS

| | | | | |
|---|---|---|---|---|
| 8,140,917 | B2 * | 3/2012 | Suetsugu et al. | 714/50 |
| 8,195,777 | B2 | 6/2012 | Hanai et al. | |
| 8,276,019 | B2 * | 9/2012 | Watanabe et al. | 714/20 |
| 8,726,076 | B2 * | 5/2014 | Goldstein et al. | 714/15 |
| 8,813,079 | B1 * | 8/2014 | Lindo et al. | 718/100 |
| 2006/0277230 | A1 | 12/2006 | Nishizawa et al. | |
| 2010/0235681 | A1 * | 9/2010 | Suetsugu et al. | 714/15 |
| 2010/0262862 | A1 * | 10/2010 | Watanabe et al. | 714/19 |

FOREIGN PATENT DOCUMENTS

| | | | |
|---|---|---|---|
| JP | 2006-338432 | A | 12/2006 |
| JP | 2009-157785 | A | 7/2009 |

OTHER PUBLICATIONS

Babcock et al., "Models and Issues in Data Stream Systems", In Proc. PODS 2002, pp. 1-16, 2002.
Hwang et al., "High-Availability Algorithms for Distributed Stream Processing", In Proc. of ICDE 2005, pp. 779-790, 2005.
Arasu et al., "The CQL Continuous Query Language: Semantic Foundations and Query Execution", pp. 1-32, 2005.
Hwang et al., "A Comparison of Stream-Oriented High-Availability Algorithms", Technical Report CS-03-17, 2003, pp. 1-13.
Hwang et al., "A Cooperative, Self-Configuring High-Availability Solution for Stream Processing", Proceedings of 2007 IEEE 23rd International Conference on Data Engineering, 2007, pp. 176-185.
Jacques-Silva et al., "Language-Level Checkpointing Support for Stream Processing Applications", Proceedings of 2009 IEEE/IFIP International Conference on Dependable Systems and Networks, 2009, pp. 145-154.

* cited by examiner

*Primary Examiner* — Joshua P Lottich
(74) *Attorney, Agent, or Firm* — Mattingly & Malur, P.C.

(57) ABSTRACT

When reproducing the running state after a failure has occurred in stream data processing, all window operations are used while minimizing the storage amount necessary for obtaining backup data. While an operator is performing stream data processing in response to a query, a query analysis unit analyzes the operator, which holds the running state of the window, etc., and the recovery points of said operator. When obtaining backup data, a backup data management unit manages the capacity necessary to obtain snapshots of the analyzed recovery points, calculates the storage area capacity needed for backing up input data up to each recovery point and the storage area capacity needed to obtain a snapshot for a window that cannot be reproduced in that way, and records the execution state by selecting a recovery point which minimizes the total value of necessary storage capacity.

15 Claims, 15 Drawing Sheets

300

```
REGISTER STREAM sa(id VARCHAR(30), val INT);

REGISTER STREAM sb(id VARCHAR(30), val INT);

REGISTER QUERY q1
  ISTREAM(
   SELECT sa. id, sa. val AS va, sb. val AS vb
       FROM sa[PARTITION BY id ROWS 2], sb[RANGE 5 MINUTES]
    WHERE sa. id = sb. id AND sa. val > 100 AND sb. val <> −1
  );

REGISTER QUERY q2
    SELECT id, MAX(va) AS va, MAX(vb) AS vb
        FROM q1[UNBOUNDED]
      GROUP BY id;

REGISTER QUERY q3
ISTREAM(SELECT * FROM q2);
```

| I | RECOVERY POINT | STORAGE AMOUNT OF INPUT DATA | W1 | W2 | W3 | W4 | W5 | REQUIRED STORAGE AMOUNT | |
|---|---|---|---|---|---|---|---|---|---|
| W1 | 9:48 | 17 | 0 | 0 | 0 | 100 | 3 | 120 | 1101 |
| W2 | 9:55 | 9 | 6 | 0 | 9 | 100 | 3 | 127 | 1102 |
| W3 | 9:50 | 14 | 6 | 0 | 0 | 100 | 3 | 123 | 1103 |
| W4 | 6:30 | 1000 | 0 | 0 | 0 | 0 | 0 | 1000 | 1104 |
| W5 | 6:48 | 900 | 0 | 0 | 0 | 100 | 0 | 1000 | 1105 |

| RECOVERY POINT | RECOVERY USING INPUT DATA | RECOVERY USING SNAPSHOT |
|---|---|---|
| 9:48(W1) | W1, W2, W3 | W4, W5 |
| 1201 | 1202 | 1203 |

DATA PROCESSING FAILURE RECOVERY METHOD, SYSTEM AND PROGRAM

TECHNICAL FIELD

The present invention relates to a fault recovery technique for data processing, and more particularly, to a technique for storing reproduction data required for fault recovery in stream data processing.

BACKGROUND ART

Stream data processing has been attracting attention as a method for quickly responding to the need for analyzing a large amount of continuously generated data in real time, such as the analysis of automatic stock trading, advanced traffic information processing, and sensor information obtained at multiple locations. The stream data processing is a general purpose middleware technology that can be applied to real-time processing of data with different formats. This allows reflecting the real-world data in business in real time, while responding to rapid changes in the business environment that are too fast to catch up to by establishing a system for each case. The principle of the stream data processing and the implementation method thereof are disclosed in Non-patent Literature 1.

As described above, the stream data processing is real time processing of a large amount of data, so that the output data of processing results are continuously generated. Thus, it is desirable that the time required for the recovery from the occurrence of a failure should be reduced as much as possible. At this time, the running state of the restored server is the initial state, so that it is necessary to provide running state reproduction in which the running state before the occurrence of a failure is also reproduced in the restored server.

The first method of running state reproduction is the upstream backup method disclosed in Non-patent literature 2. In the upstream backup method, the input data is backed up during normal operation. Then, upon recovery the backup data is re-executed by a standby server to catch up to the running state of the currently used server. The longer the processing time, the larger the storage amount of the disk and memory. However, it can be assumed that the storage amount is kept within a certain range due to the following reasons.

The stream data processing can use window operations to cut out the latest part of the data series. The definition of the window operation is disclosed in Non-patent literature 3. For example, the aggregate function is applied to the data that is cut out by a window operation for the duration of one minute to calculate the median, resulting in the operation of the calculation of the moving average for one minute. In this example, when the data is allowed to flow for one minute, the data in the window is renewed. This means that when recovery is started from the initial state, the running state returns to the running state before failure by processing the data for the last one minute. As described above, in the upstream backup method, it can be assumed that the amount of storage for backup is within a certain range based on the assumption that the range of data to be held moves to the future with the progression of the process.

The second method of running state reproduction is as follows. First, the running state is made static by periodically interrupting the running server. Then, static running state is stored as a replication (snapshot). In this way, when a failure occurs and restoration takes place, the running state is reproduced from the stored snapshot. The method of making the running state static and storing the snapshot is widely used in the database and transaction systems. The reproduction method using the static approach in an in-memory database is disclosed in Patent literature 1.

CITATION LIST

Patent Literature

Patent Literature 1: Japanese Patent Application Laid-Open No. 2009-157785

Non-Patent Literature

Non-patent Literature 1: B. Babcock, S. Babu, M. Datar, R. Motwani and J. Widom, "Models and issues in data stream systems", In Proc. of PODS 2002, pp. 1-16 (2002)

Non-patent Literature 2: J. H. Hwang, M. Balazinska, A. Rasin, U. Cetinternel, M. Stonebraker and S. B. Zdonik, "High-Availability Algorithms for Distributed Stream Processing", In Proc. of ICDE 2005, pp. 779-790 (2005)

Non-patent Literature 3: A. Arasu, S. Babu and J. Widom, "The CQL Continuous Query Language: Semantic Foundations and Query Execution", (2005)

SUMMARY OF INVENTION

Technical Problem

There are the following problems with the running state reproduction by the upstream backup method described above. The window operation processed by a stream data processing system includes a number window (rows window), a group specific window (partition window), a permanent window (unbounded window), and the like, in addition to the time window (range window) described above. Unlike the time window, these windows may not possibly be renewed only by the time elapsed. For example, in the analysis of the stock market, the process of calculating the volume of the last traded 100 shares for each stock can easily be defined by the use of the group specific window. At this time, if there is a stock with a low trading volume, the transaction data of the particular stock remains on the window. Further, the process of calculating the total value of all transactions from the start of the analysis can easily be defined by the use of the permanent window. In this case, however, all the data after the start of the process remains on the window and will not be renewed.

When the upstream backup method is applied to such a case, the start point of the data range to be held does not move forward. Thus, the amount of storage required to hold the data increases endlessly, resulting in overflow in some stage.

On the other hand, in the running state reproduction method using a snapshot, all the window operations can be used. However, the output of the result is stopped during the time when the running server is interrupted, resulting in the influence of process interruption on the application. When the running state includes a plurality of data pieces with very large size, such as "all data transmitted for the past several minutes", it is necessary to have a very large amount of storage to obtain a snapshot.

The problem of the present invention to be solved is to provide the use of not only the time window but also all the window operations, while minimizing the amount of storage necessary for backup data acquisition, in the reproduction of the running state of the stream data processing.

In other words, an object of the present invention is to provide a data processing fault recovery method, system, and program that can solve the above problem.

Solution to Problem

In order to achieve the above object, the present invention is a fault recovery method for stream data processing using a computer. The computer obtains the amount of stream data, based on the recovery point of each operator holding the running state with respect to the operators constituting stream data processing, from the earliest time of an operator holding the running state with a recovery point after the particular recovery point. The computer also obtains the amount of replicated data of an operator holding the running state with a recovery point before the particular recovery point. Next, the computer calculates the recovery point where the sum of the amount of the stream data and the amount of the replicated data is the minimum. Then, the computer records the stream data and the replicated data at the calculated recovery point.

Further, in order to achieve the above object, the present invention is a fault recovery system for stream data processing performed by a computer including a processing unit and a storage unit. The processing unit of the computer includes a query analysis unit for analyzing operators holding the running state with respect to the operators performing stream data processing in response to a query, as well as their recovery points. Further, the processing unit of the computer also includes a backup data management unit. The backup data management unit obtains the amount of stream data based on each of the recovery points analyzed by the query analysis unit, from the earliest time of an operator holing the running state with a recovery point after the particular recovery point. The backup data management unit also obtains the amount of the replicated data of an operator holding the running state with a recovery point before the particular recovery point. Then, the backup data management unit determines the recovery point so that the sum of the amount of the stream data and the amount of the replicated data is the minimum at each of the recovery points. Thus, the fault recovery system stores the running state of the stream data processing in the storage unit at the determined recovery point.

Further, in order to achieve the above object, the present invention is a fault recovery program executed by a processing unit of a computer that performs stream data processing based on a query. The fault recovery program causes the processing unit to perform operations including: analyzing operators holding the running state with respect to the operators performing stream data processing in response to a query, as well as their recovery points; obtaining the amount of stream data based on each of the analyzed recovery points, from the earliest time of an operator holding the running state with a recovery point after the particular recovery point, and also obtaining the amount of the replicated data of an operator holding the running state with a recovery point before the particular recovery point; determining the recovery point so that the sum of the amount of the stream data and the amount of the replicated data is the minimum at each recovery point; and recording the running state of the stream data processing at the determined recovery point.

Still further, in order to solve the above problem, the data processing fault recovery method according to a preferred embodiment of the present invention reproduces the running state by the following steps:

(1) Manage the time of the input of the oldest data required to reproduce the current state, as the point where the running state can be reproduced by the upstream backup method, with respect to each of the operators holding the running state such as of all windows included in stream data processing, regardless of the type such as time, number, or group specific.

(2) Calculate and manage the size of the record area required to reproduce the running state at each of the recovery points with respect to the operators holding the running state such as of all windows, by using the upstream backup method for storing the backup data for an operator holding the running state such as of a window with a recovery point after the particular recovery point, and by using a method of obtaining a replication (snapshot) for an operator holding the running state of, for example, a window with a recovery point before the particular recovery point.

(3) Select the recovery point where the storage amount is the minimum of the sum of the record areas required to reproduce the running state at all calculated recovery points. Then, store the backup data of stream data after the particular recovery point, and obtain a replication (snapshot) of a window with a recovery point before the particular recovery point.

(4) In the running state reproduction for fault recovery, first, input data from the particular recovery point. When the process of this part is completed, overwrite data of a window having a replication (snapshot) with data from the snapshot. Then, start the process of the stream after the backup data is obtained.

Advantageous Effects of Invention

According to the present invention, it is possible to use all the operators holding the running state, including not only the time window but also other windows, while keeping the amount of storage required for backup data acquisition to be minimum in the running state reproduction of stream data processing. More specifically, it is possible to compare whether the running state is reproduced by obtaining a snapshot or by using the upstream backup method for each operator holding the running state, to select the method in which the record area is smaller than the other.

DESCRIPTION OF EMBODIMENTS

Hereinafter, embodiments of the present invention will be described in detail with reference to the accompanying drawings. Note that components having the same function are denoted by the same reference symbols throughout the drawings for describing the embodiments, and the repetitive description thereof will be omitted. It should also be noted that, as described below, in this specification, the operator includes a scan operator, a filter operator, and various types of window operations.

First Embodiment

First, the basic configuration of a stream data processing system according to a first embodiment will be described with reference to FIGS. 1 and 2.

Figure 1:
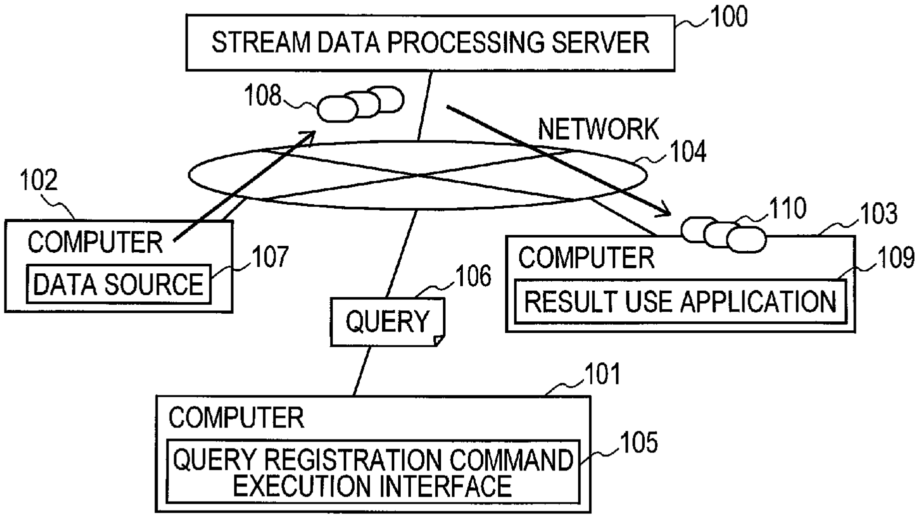
FIG. 1 is a diagram of the configuration of a computer environment in which a stream data processing server according to a first embodiment is used.

As shown in FIG. 1, a stream data processing server 100 and computers 101, 102, and 103 are connected to a network 104. The stream data processing server 100 receives data 108 from the computer 102 in which a data source 107 operates, through the network 104. Then, the stream data processing server 100 transmits data 110, which is the process result, to a result use application 109 on the computer 103. Further, a query registration command execution interface 105 operates on the computer 101.

Figure 2:
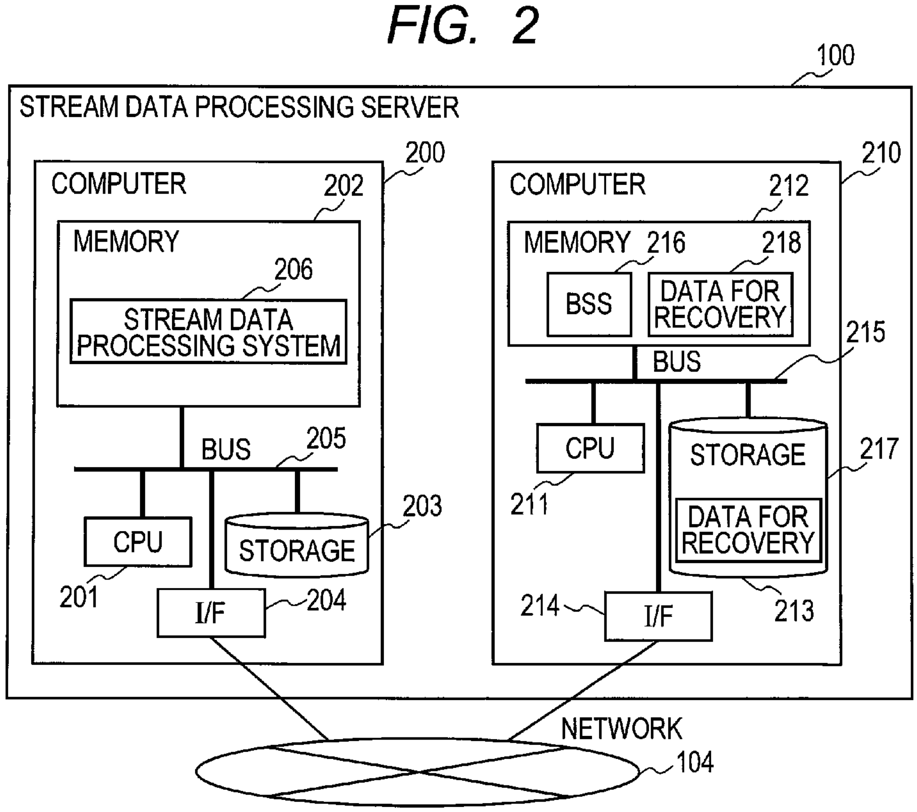
FIG. 2 is a block diagram of an example of the configuration of the stream data processing server according to the first embodiment.

As shown in FIG. 2, the stream data processing server 100 includes computers 200 and 210. The computers 200 and 210 include memories 202 and 212 which are storage units, central processing units (CPU) 201 and 211 which are processing units, network interfaces (I/F) 204 and 214, storages 203 and 213 which are storage units, and buses 205 and 215 for connecting these components. A stream data processing system 206 is provided on the memory 202 to define the logical operation of the stream data processing. The stream data processing system 206 is a running image that can be interpreted and executed by the CPU 201 as described below.

As shown in FIG. 2, the computers 200 and 210 of the stream data processing server 100 are connected to an external network 104 through the network I/Fs 204 and 214, respectively.

The computer 200 of the stream data processing server 100 receives a query 106 defined by a user, through the query registration command execution interface 105 running on the computer 101 connected to the network 104. Then, the stream data processing system 206 generates inside a query graph to allow the stream data processing to be performed according to the definition. Next, the computer 200 of the stream data processing server 100 receives the data 108 transmitted by the data source 107 running on the computer 102 connected to the network 104. Then, the stream data processing system 206 processes the data 108 according to the query graph, generates the result data 110, and transmits to the result use application 109 running on the computer 103. The storage 203 stores the once received query 106, in addition to the stream data processing system 206. It is also possible that the stream data processing system 206 loads the definition from the storage 203 at the time of the startup to generate the query graph.

A backup storage system (BSS) 216 is stored in the memory 212 of the computer 210 for the purpose of recovery in case a failure occurs in the stream data processing system 206. Further, one or both of the memory 212 and the storage 213 that form the computer 210 include data for recovery 217 and 218 required for recovery when a failure occurs in the stream data processing system 206.

Note that the above described configuration of the stream data processing server according to this embodiment is an example. It is possible that the computers 200 and 210 are a single computer. Further, it is possible that the CPUs 201 and 211, which are the processing units, are two processors on a single computer, or two computing cores in a multi-core CPU. Still further, it is also possible that the memories 202 and 212, the network I/Fs 204 and 214, and the storages 203 and 213 are configured as a single unit connected to a single computer or connected to two computers and shared, respectively. The computer as referred to in this specification includes all these cases, and this is the same for the processing unit and the storage unit.

Next, an example of a query and a query graph in stream data processing according to this embodiment will be described with reference to FIGS. 3 and 4.

Figures 3, 4:
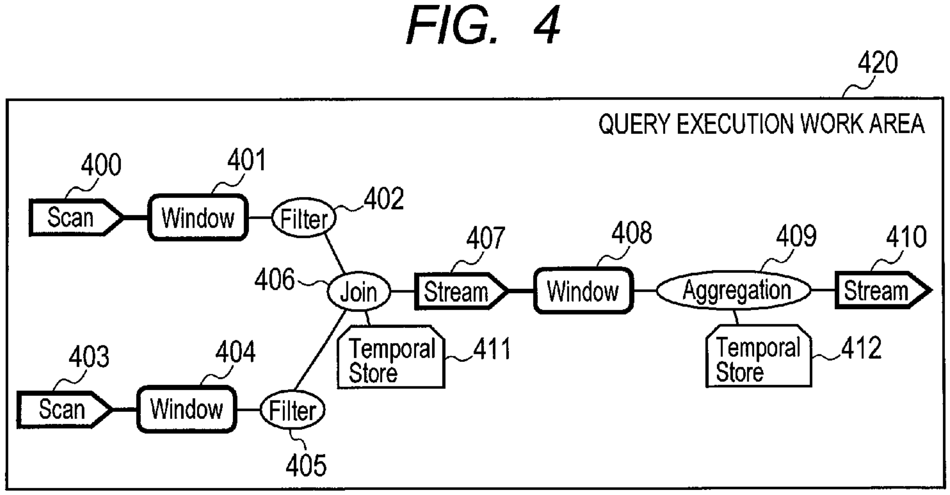
FIG. 3 is a view of an example of the definition of data processing according to the first embodiment.
FIG. 4 is a view of the result of converting the definition of data processing shown in FIG. 3 into a query graph.

As shown in FIG. 3, a query 300 defines two input streams sa and sb, as well as three queries q1, q2, and q3.

As shown in FIG. 4, the stream data processing system receives the definition of the query 300. Then, the stream data processing system generates a query graph, which is formed by operators 400 to 410, on a query execution work area 420 allocated in its execution area. The operator includes operators such as scan operators 400 and 403, filter operators 402 and 405, a join operator 406, and a stream operation operator 407, and also includes various windows 401, 404, 408, and the like. The operator 400 is the scan operator that receives the input stream sa from the data source. The operator 403 is the scan operator that receives the input stream sb from the data source. Both of the streams sa and sb are the system of data formed by two columns, a character string column id and an integer column val.

The operators 401, 402, 404, 405, 406, and 407 are the operator group of the partial query graph corresponding to the query q1. The operator 401 is the group specific window (PARTITION BY id ROWS 2) that is applied to the stream sa to cut out the last two data pieces for each column id. The operator 404 is the time window (RANGE 5 MINUTES) that is applied to the stream sb to cut out data within the last 5 minutes. The operator 402 is the filter operator (sa. val>100) that is applied to the data cut out in the window 401. The operator 402 causes only data with the value of the column val greater than 100 to pass through. The operator 405 is the filter operator (sb. val< >−1) that is applied to the data cut out in the window 404. The operator 405 causes data to pass through, except those with the value of the column val equal to −1. The operator 406 is the join operator (sa. id=sb. id). The operator 406 generates a combination of data with the same column id from the data passing through the operators 402 and 405, respectively. The operator 407 is the stream operation for normalizing the result of the query.

The operators 408 and 409 are the operator group of the partial query graph corresponding to the query q2. The operator 408 is the permanent window (UNBOUNDED) and holds all result data of the query q1. The operator 409 is the aggregation operator and calculates the maximum values of sa. val and sb. val for each query id. Further, the operator 410 is the stream operation operator of the partial query graph corresponding to the query q3.

A buffer areas (temporal store) 411 and 412 are the areas for storing the running state of the join operator 406 and the running state of the aggregation window 409, respectively. The buffer area 411 stores surviving data in each of the left and right inputs of the operator 406. These data pieces are to be joined to data coming to the input on the opposite side. The buffer area 412 stores one data piece of the aggregation result for each group.

In addition to the join and aggregation operators having the buffer areas as described above, the window operation is also the operator that holds the running state. The window operation defines the survival time for each input data piece, and stores the survival data. The other operators, such as the filter operator, projection operator, stream operator, and scan operator, may not be necessary to hold the running state.

Next, an example of the running state in the example of the query graph shown in FIG. 4 will be described with reference to FIG. 5. The figure shows the state in which data pieces 501 to 506 are stored in the window operation W1 401 and data pieces 511 to 517 are stored in the window operation W2 404. The long ellipse for each data represents the time stamp of the data, the square on the left side represents the value of the column id, and the square on the right side represents the value of the column val. The group specific window 401 stores at most two data pieces for each column id. The time window 404 stores data for time stamps from 9:55 to 9:59.

The buffer area W3 411 stores surviving data pieces 501, 503, 504, and 505 in the left input as well as surviving data pieces 512, 513, 514, 516, and 517 in the right input. These data pieces are the data set satisfying the filter condition, sa. val>100, with respect to the data sets stored in the window operation 401, and are the data set satisfying the filter condition, sb. val< >−1, with respect to the data sets stored in the window operation 404. Further, the join condition is the sign condition on the column id, so that the value of the column id is indexed as a key. The values of the column id are classified into groups and stored.

The window operation W4 408 stores combination data pieces 521 to 531 that satisfy the join condition, sa. id=sb. id, in the direct product of the left input data set and the right input data set that are recorded in the buffer area 411. The time stamps of these data pieces are managed in such a way that the time stamp later than the other one is selected from the combination of the left and right data. The window operation 408 is the permanent window and stores all the data from the time when the process is started. For this reason, very old data such as the combination data 521 exist in this window.

The buffer area W5 412 obtains aggregate data by grouping the data stored in the window operation 408 by the column id, and stores one aggregate data piece for each group. The buffer area W5 412 stores data pieces 541, 542, and 543 for the column ids a, b, and c, respectively. Here, the buffer area W5 412 can be configured to store the average, the maximum value, or the minimum value of each group for each column id. In the case of FIG. 5, the buffer area W5 412 is configured to store the maximum value.

Figure 6:
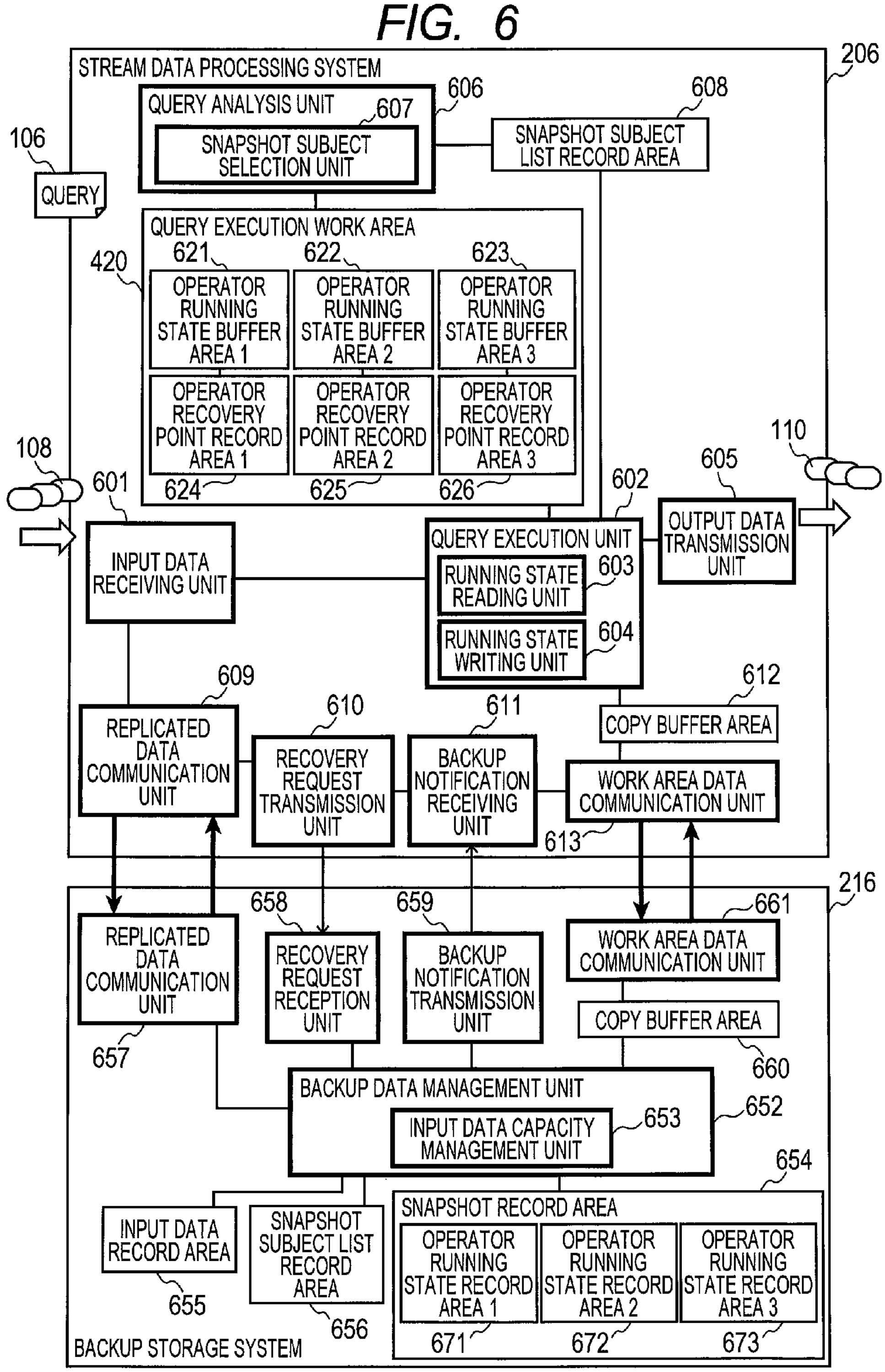
FIG. 6 is a view of an example of the running state recording method in stream data processing according to the first embodiment.

Next, an example of the block configuration of the software that realizes the stream data processing according to this embodiment will be described with reference to FIG. 6. Note that in this figure, various software functions executed by the CPU are schematically shown by thick line blocks, while various data storage areas formed on the memory are schematically shown by thin line blocks.

In this figure, the stream data processing system 206 includes an input data receiving unit 601 for receiving the input data 108, a query execution work area 420 for storing the query graph and the running state of the operators, a query execution unit 602 for executing a query based on the data of the query execution work area 420, and an output data transmission unit 605 for outputting the query execution result 110, respectively. The query execution work area 420 includes operator running state buffer areas 621 to 623 for storing the running state of the respective operators. Further, the query execution work area 420 allocates operator recovery point record areas 624 to 626 to store the recovery point showing the time of the oldest of the input data used for the internal state in each operator, as well as the amount of the data stored as a snapshots, with respect to the operator running state buffer areas 621 to 623, respectively.

Further, the stream data processing system 206 also includes a query analysis unit 606 for analyzing the query 106 to generate the query graph on the query execution work area. The query analysis unit 606 includes a snapshot subject selection unit 607 for selecting the operator to obtain a running snapshot in the operator group on the query graph. The operator group selected by the snapshot subject selection unit 607 is recorded in the snapshot subject list record area 608.

In addition, the stream data processing system 206 includes: a replicated data communication unit 609 for transmitting a replication of the input data 108 received by the input data receiving unit 601, or transmitting the replicated input data for recovery transmitted from the backup storage system 216; a recovery request transmission unit 610 for requesting to transmit the data for recovery from the backup storage system 216; a backup notification receiving unit 611 for receiving a backup request transmitted from the backup storage system 216; a copy buffer area 612 for temporarily storing the running state of the operators and the snapshot subject list; and a work area data communication unit 613 for transmitting and receiving the running state of the operators as well as the snapshot subject list to and from the backup storage system 216.

Here, the query execution unit 602 includes: a running state reading unit 603 for copying the content stored in each of the operator running state buffer areas 621 to 623, to the copy buffer area 612 according to the snapshot subject list record area 608. Further, the query execution unit 602 also includes a running state writing unit 604 for copying the content stored in the copy buffer area 612 to the content stored in each of the operator running state buffer areas 621 to 623.

The backup storage system 216 includes: a replicated data communication unit 657 for communicating the replication of the input data 108 with the storage data processing system 206; a recovery request receiving unit 658 for receiving a recovery request transmitted from the storage data processing system 206; a backup notification transmission unit 659 for requesting a backup process to the storage data processing system 206; a copy buffer area 660 for temporarily storing the running state of the operators as well as the snapshot subject list; and a work area data communication unit 661 for transmitting and receiving the running state of the operators as well as the snapshot subject list to and from the storage data processing system 206.

Further, the backup storage system 216 also includes an input data record area 655 for storing the replicated input data; a snapshot subject list record area 656 for storing the snapshot subject list; and a snapshot record area 654 for storing the snapshot. Here, the snapshot record area 654 includes operator running state record areas 671 to 673.

In addition, the backup storage system 216 also includes a backup data management unit 652. The backup data management unit 652 includes an input data capacity management unit 653 for monitoring the capacity of the input data record area 655.

Figure 7:
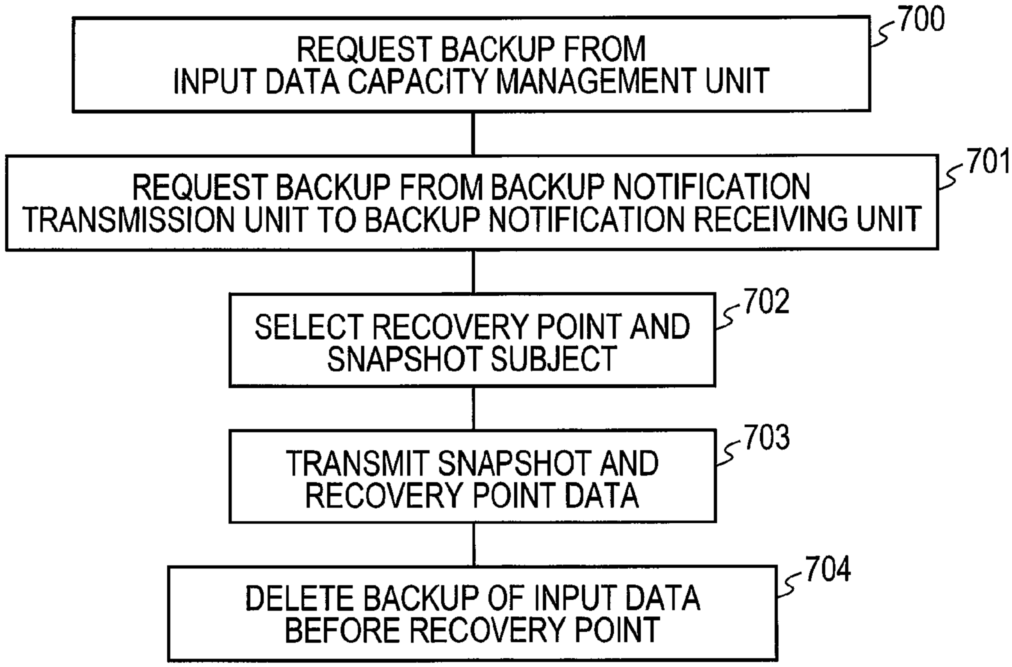
FIG. 7 is a flow chart of the operation for a backup request according to the first embodiment.
Figure 8:
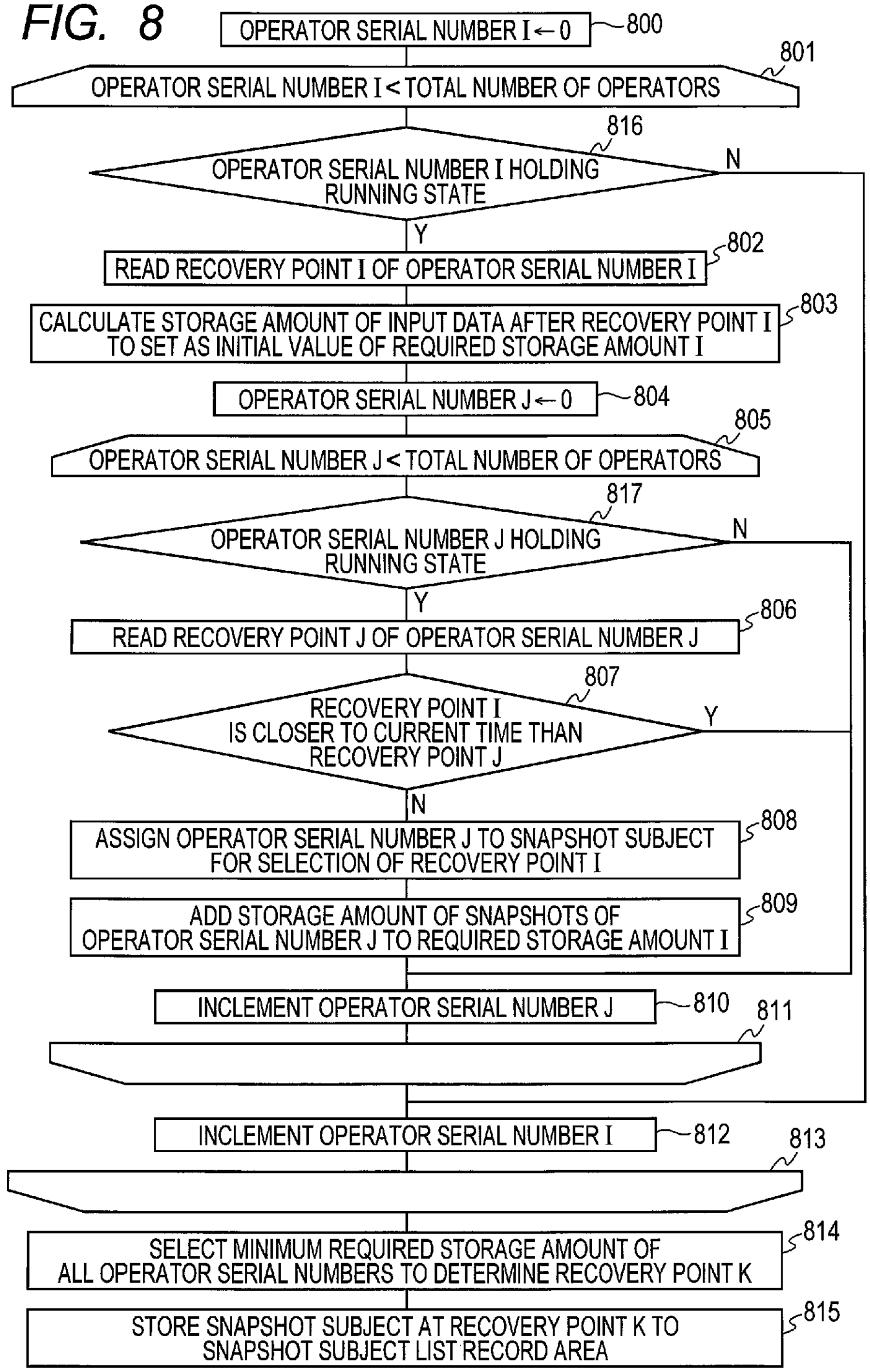
FIG. 8 is a flow chart of the operation for selecting a snapshot subject according to the first embodiment.

Next, FIGS. 7 and 8 show an example of the update process flow of the backup data according to this embodiment.

First, FIG. 7 is the flow of the process in which a backup request is transmitted from the backup storage system 216, the backup data is transmitted from the stream data processing system 206, and the backup data stored in the backup storage system 216 is updated.

In step 700, the input data capacity management unit 653 transmits a backup request to the backup notification transmission unit 659 for reasons such as “the input data capacity reaches a specified value” and “a predetermined time has elapsed from the previous backup”. Next, in step 701, the backup notification transmission unit 659 transmits the backup request to the stream data processing system 206. Next, in step 702, the stream data processing system 206, which receives the backup data request by the backup notification receiving unit 611, selects the operator as the snapshot subject, from the operators holding the running state by the snapshot subject selection unit 607. In step 703, the stream data processing system 206 transmits a snapshot of the selected operator as well as the recovery point data to the backup storage system 216. Finally, in step 704, the backup storage system 216 stores the snapshot and deletes the replicated input data before the transmitted recovery point.

Next, FIG. 8 shows the details of step 702 described above. First, the process of steps 802 to 811 is repeated until the operator serial number I reaches the number of subject operators in steps 800, 801, 812, and 813. First, in step 816, the stream data processing system 206 checks whether the operator of the operator serial number I holds the running state. When the operator holds the running state, in step 802, the stream data processing system 206 reads a recovery point I of the operator serial number I from the operator recovery point record area. Next, in step 803, the stream data processing system 206 inquires the input data capacity management unit 653 about the storage amount of the input data after the recovery point I to set as the initial value of the required storage amount I.

Next, the process of steps 806 to 809 is repeated until the operator serial number J reaches the number of subject operators in steps 804, 805, 810, and 811. First, in step 817, the stream data processing system 206 checks whether the operator serial number J holds the running state. When the operator serial number J holds the running state, in step 806, the stream data processing system 206 reads a recovery point J of the operator serial number J from the operator recovery point record area. Then, in step 807, the stream data processing system 206 compares the recovery point I of the operator serial number I with the recovery point J of the operator serial number J. When the recovery point I is closer to the current time than the recovery point J, the process proceeds to step 810, otherwise proceeds to the step 808. In step 808, the stream data processing system 206 assigns the operator serial number J to the snapshot subject for the selection of the recovery point I. Next, in step 809, the stream data processing system 206 adds the storage amount of snapshots of the operator serial number J to the required storage amount I. The process of steps 806 to 809 is repeated for all records of the operator serial number J. Then, the same process is repeated for all records of the operator serial number I.

In step 814, the stream data processing system 206 selects the minimum required storage amount for all the operator serial numbers to determine the recovery point K. Next, the stream data processing system 206 stores the snapshot subject at the recovery point K to the snapshot subject list record area 608.

Next, a specific example of the operation of selecting the snapshot subject according to this embodiment will be described with reference to FIGS. 9, 10, 11, 12, 13A, and 13B.

Figure 5:
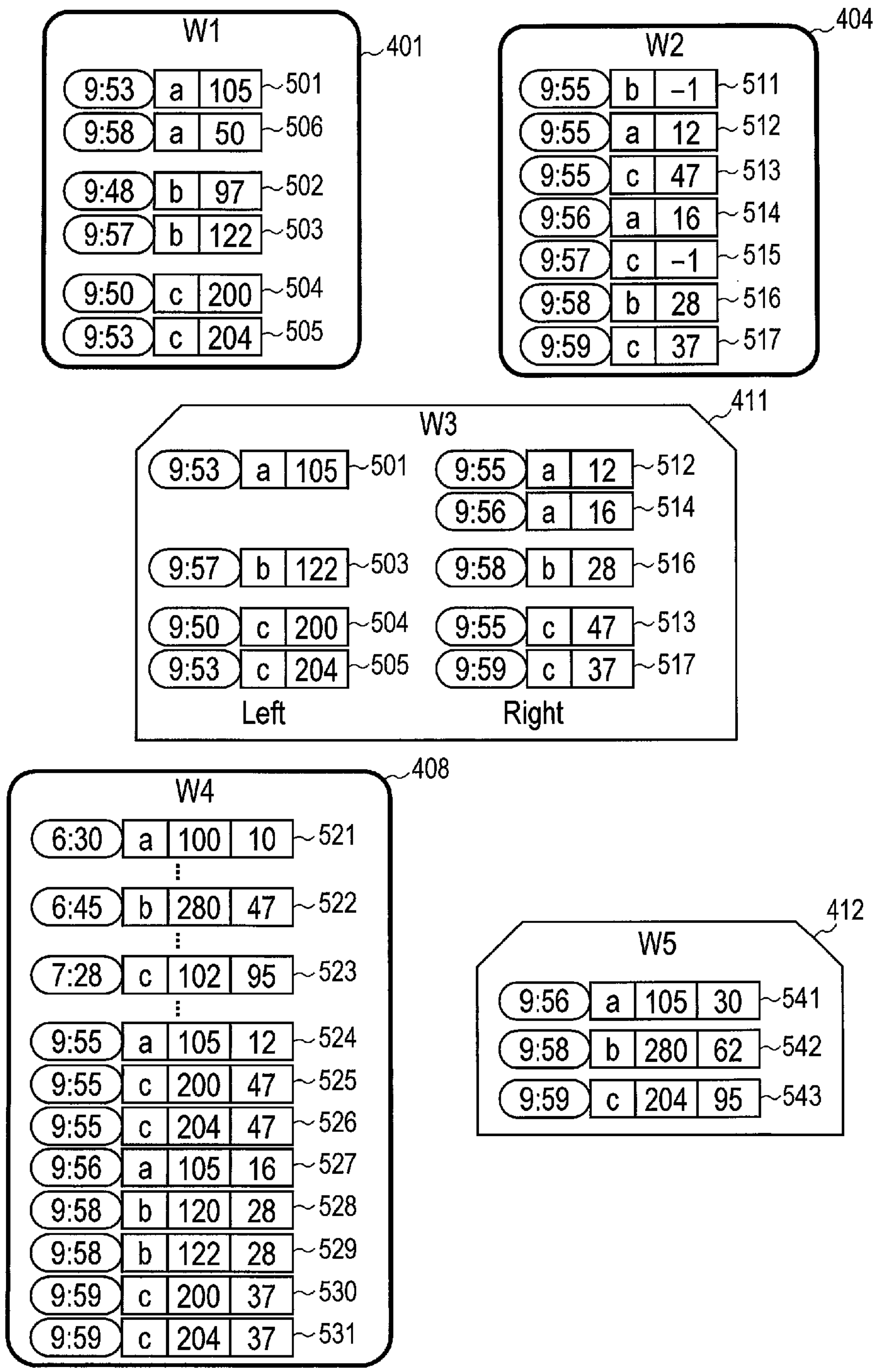
FIG. 5 is a view of an example of the running state in the example of the query graph shown in FIG. 4, according to the first embodiment.
Figure 9:
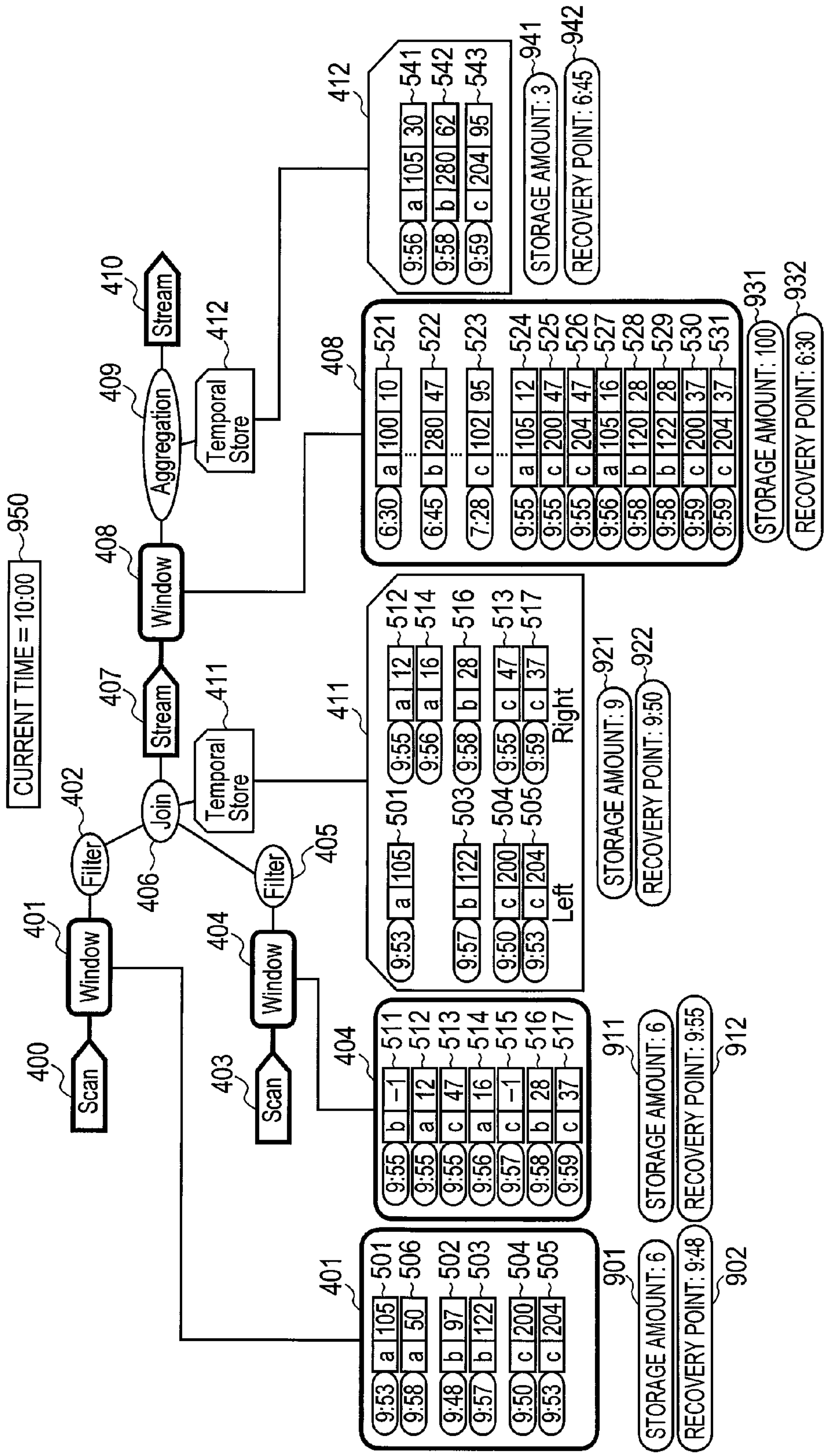
FIG. 9 is a view illustrating the running state, amount of storage, and recovery point for each operator at the backup data acquisition time according to the first embodiment.

First, FIG. 9 is a schematic diagram based on the query graph including 400 to 412 shown in FIG. 4 and on the running state of the windows of the individual operators shown in FIG. 5, in which the storage amount at the time of the snapshot acquisition as well as the recovery point are added to the running state of each window. In FIG. 9, the storage amount shows the number of data pieces of the stream data. However, the present invention is not limited to this example. It goes without saying that the capacity of the memory for storing each data piece, and the like, can also be used.

In this example, it is assumed that the stream data processing system starts the process at the time of 6:30, and performs the backup process when a current time 950 is 10:00. At this time, six data pieces 501 to 506 exist in the window W1 401, in which the data 502 of “time 9:48, ID=b, VAL=97” is the oldest data. Thus, a storage amount 901 required for the snapshot of the window W1 401 is 6 and a recovery point 902 is 9:48. Similarly, a storage amount 911 for W2 404 is 6 and a recovery point 912 is 9:55, and a storage amount 921 for W3 411 is 9 and a recovery point 922 is 9:50. Because W4 408 is the permanent window, the window stores all the data transmitted to W4 from the start of the stream data processing system.

Thus, a storage amount 931 is as large as 100, and a recovery point 932 is as early as 6:30 corresponding to 521 which is the oldest data. In W5 412, the window stores the maximum value of each ID, so that a storage amount 941 is as small as 3. However, the data from which maximum data 542 of the ID=b is derived is data 522 input at 6:45. Thus, a recovery point 942 is 6:45 which is the same as that of 522. In this way, the storage amount and the recovery point for the running state of the window of each operator are determined.

Figures 10, 11:
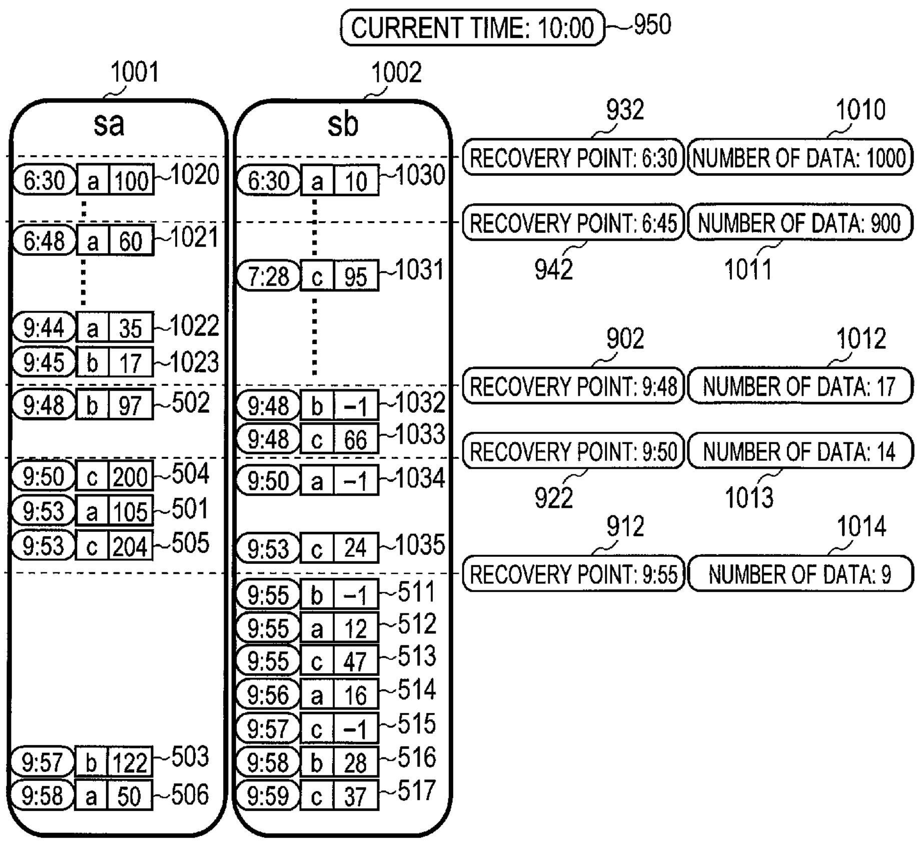
FIG. 10 is a view of an example of the input data from immediately after the start of the stream data processing system to the time of the backup data acquisition, as well as the amount of data at the recovery point of each operator.
FIG. 11 is an example of a list of the amount of storage required for backup in the recover point selection for each operator according to the first embodiment.

Next, FIG. 10 shows the backup of the input data 108 recorded in the input data record area 655, as well as the number of data pieces after the recovery point of the running state in each operator shown in FIG. 9.

A data group sa 1001 is a data group input to the Scan 400, including the data pieces 501 to 506, data 1020 to 1023, and the like. A data group sb 1002 is a data group input to a Scan 430, including the data pieces 511 to 517 and data pieces 1030 to 1035. The data pieces are recorded at each recovery point. In this case, when the data are stored from 6:30 which is the recovery point 932 of W4 408, a number of recorded data pieces 1010 is 1000. Similarly, when the data is stored from 6:45 which is the recovery point 942 of W5 412, a number of recorded data pieces 1011 is 900. When the data is recorded from 9:48 which is the recovery point 902 of W1 401, a number of data pieces 1012 is 17. When the data is recorded from 9:50 which is the recovery point 922 of W3 411, a number of data 1013 is 14. Further, when the data is recorded from 9:55 which is the recovery point 912 of W2 404, a number of data pieces 1014 is 9.

FIG. 11 is a list of the results of performing the steps 800 to 813 using these pieces of information. When 9:48 which is the recovery point 902 of W1 is selected, the recovery point of W2 is 9:55 and the recovery point of W3 is 9:50. Thus, it is possible to reproduce the running state of W1, W2, and W3 based on the backup of the input data. On the other hand, the recovery points of W4 and W5 are earlier than that of W1, so that the running states of W4 and W5 are not reproducible with the backup of the input data. For this reason, it is necessary to obtain snapshots for W4 and W5.

As a result, a required storage amount 1101 is 120, which is the sum of the number of data pieces 1012 of the input data backup at the recovery point 902 of W1, 17, and the storage amounts 931, 941 of the snapshots W4 and W5. Similarly, a required storage amount 1102 of W2 for the recovery point selection is calculated to be 127, a required storage amount 1103 of W3 is calculated to be 123, a required storage amount 1104 of W4 is calculated to be 1000, and a required storage amount 1105 of WE is calculated to be 1000, respectively.

Figures 12, 13A:
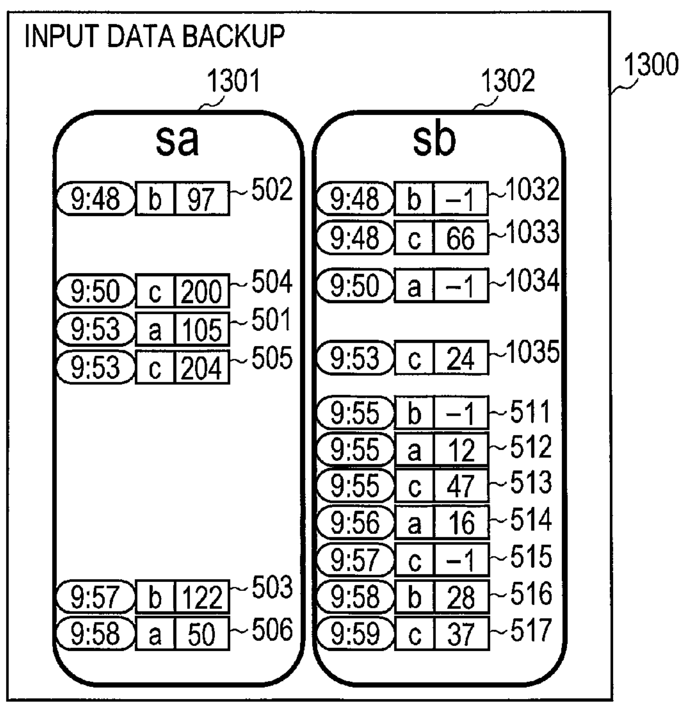
FIG. 12 is an example of a list of the selected recovery point, operators whose running state is reproduced using the input data, and operators whose running state is reproduced using a snapshot, according to the first embodiment.
FIG. 13A is view of an example of the backup data for recovery according to the first embodiment.

FIG. 12 is a list of the operators for reproducing from the recovery point and the snapshot, when the recovery point of W1 with the minimum required storage amount is selected in steps 814 and 815.

At this time, a recovery point 1201 is 9:48 which is the recovery point of W1, an operator 1202 for reproduction based on the backup of the input data includes W1, W2, and W3, and an operator 1203 for reproduction based on the snapshot includes W4 and W5.

Figure 13B:
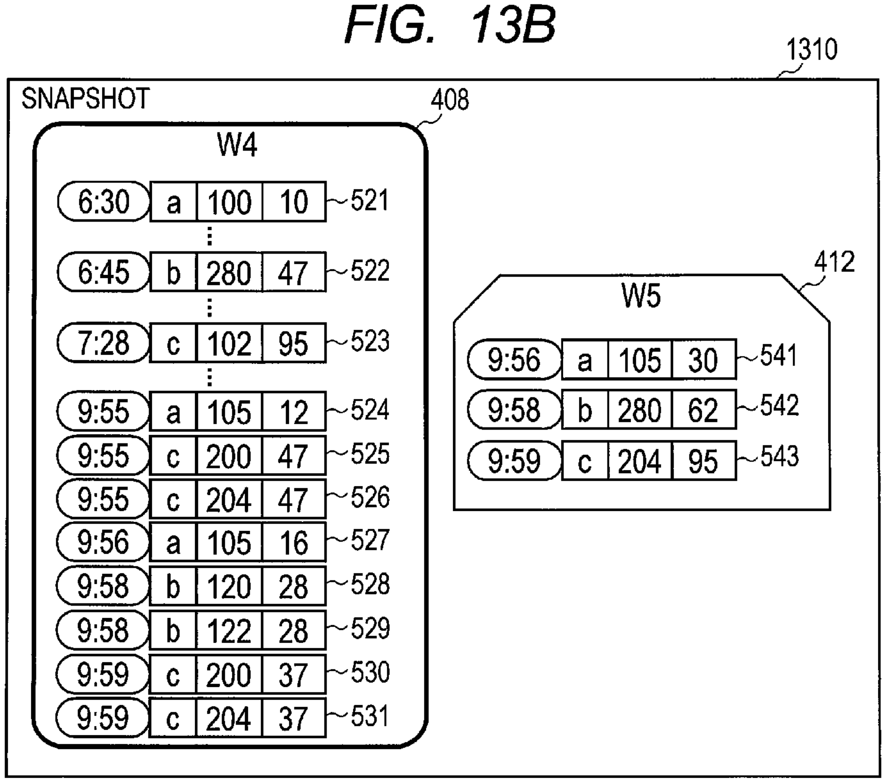
FIG. 13B is a view of an example of the backup data for recovery according to the first embodiment.

FIGS. 13A and 13B show backup 1300 and snapshot 1310 of the input data to be stored, respectively, according to the present embodiment. The backup 1300 of the input data stores the data after 9:48 which is the recovery point. The snapshot 1310 stores the running state of W4 and W5.

Figure 14:
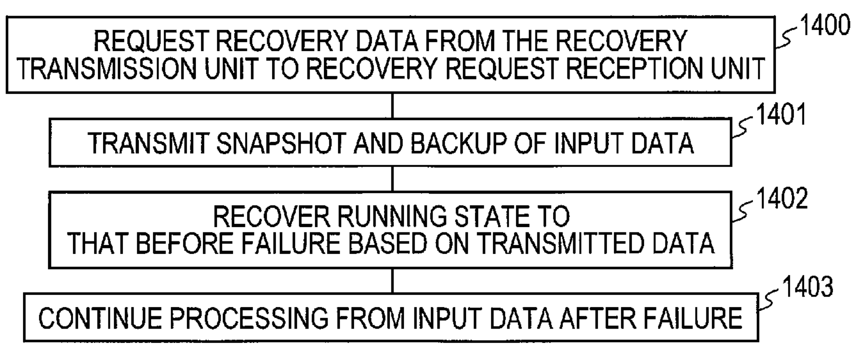
FIG. 14 is a flow chart of the operation for a recovery request from the stream data processing system according to the first embodiment.

Next, FIG. 14 is a flow chart of the procedure for reproducing the running state of the stream data processing system to the initial state, based on the backup and snapshot of the input data.

In step 1400, the recovery request transmission unit 610 of the stream data processing system 206 transmits a recovery request to the backup storage system 216. In response to the request, in step 1401, the backup storage system 216 transmits the backup and snapshot of the input data to the stream data processing system 206. In step 1402, the stream data processing system 206 to which the backup data and snapshot of the input data are transmitted, recovers to the running state before a failure occurred. Finally, in step 1403, the stream data processing system 206 continues the process from the input data after the failure.

Figure 15:
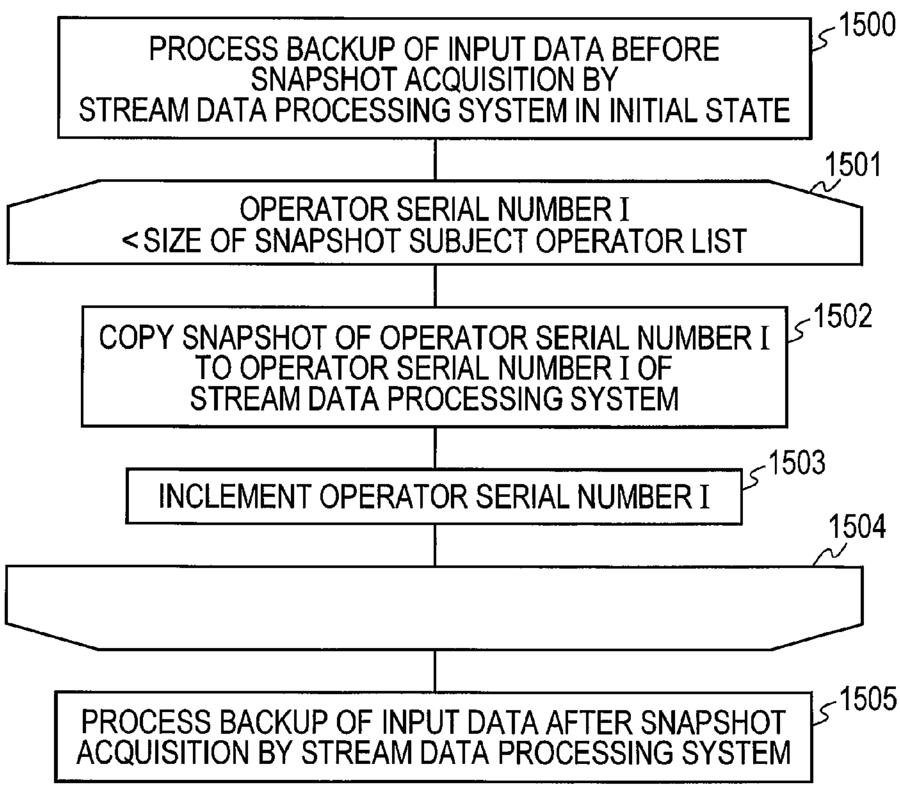
FIG. 15 is a flow chart of the operation for reproducing the running state of the stream data processing system based on the backup data at the time of a recovery request, according to the first embodiment.

FIG. 15 shows the details of step 1402 shown in FIG. 14. First, in step 1500, the backup of the input data from the recovery point to the backup data acquisition time is processed by the stream data processing system 206 in the initial state. Next, in steps 1501 to 1504, the running state of the snapshot is copied to all the operators with the snapshot obtained. Finally, the backup of the input data from the backup data acquisition to the time just before the failure is processed by the stream data processing system 206.

Figure 16:
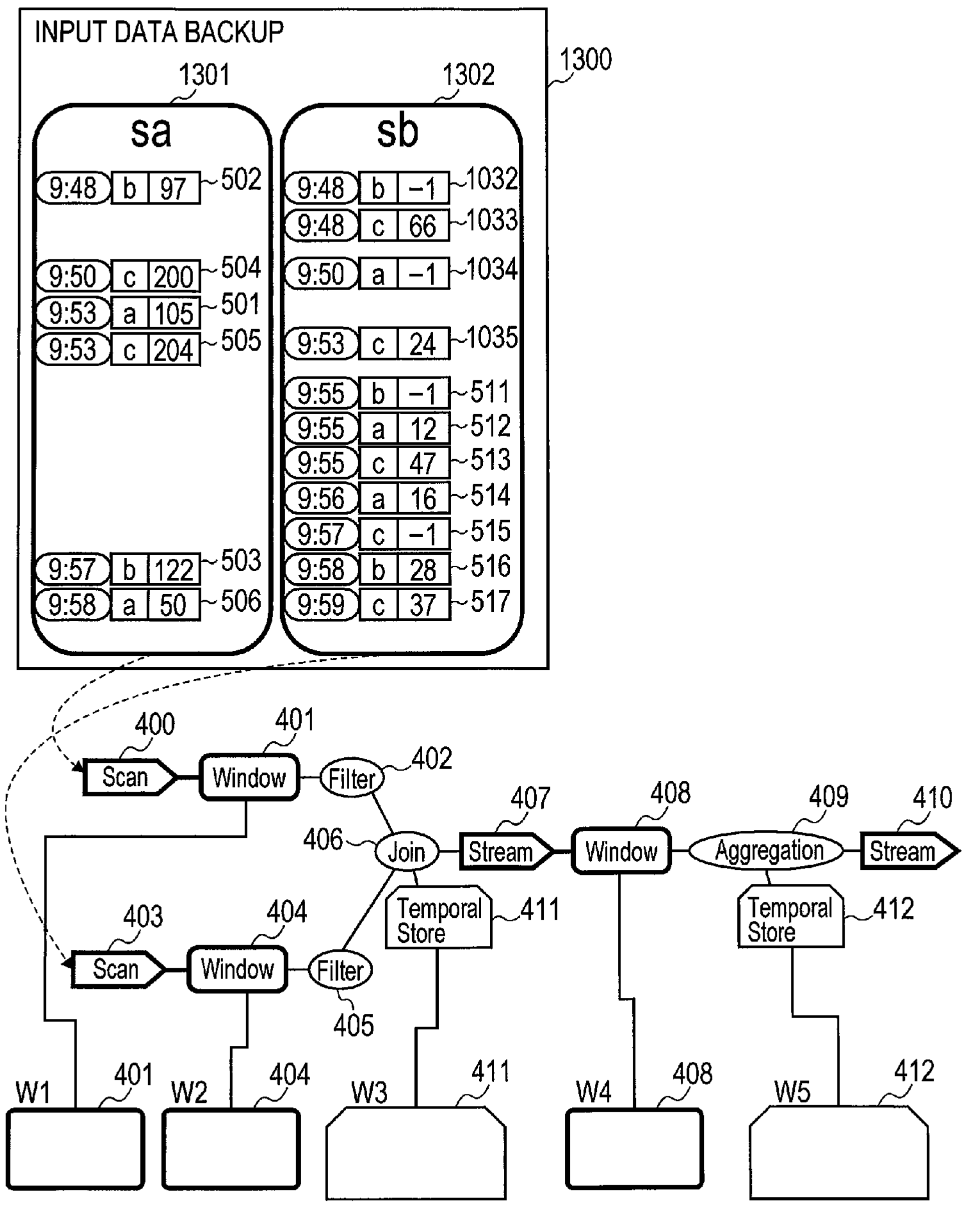
FIG. 16 is a view of an example of the operation for causing the stream data processing system in the initial state to process the backup of the input data according to the first embodiment.
Figure 17:
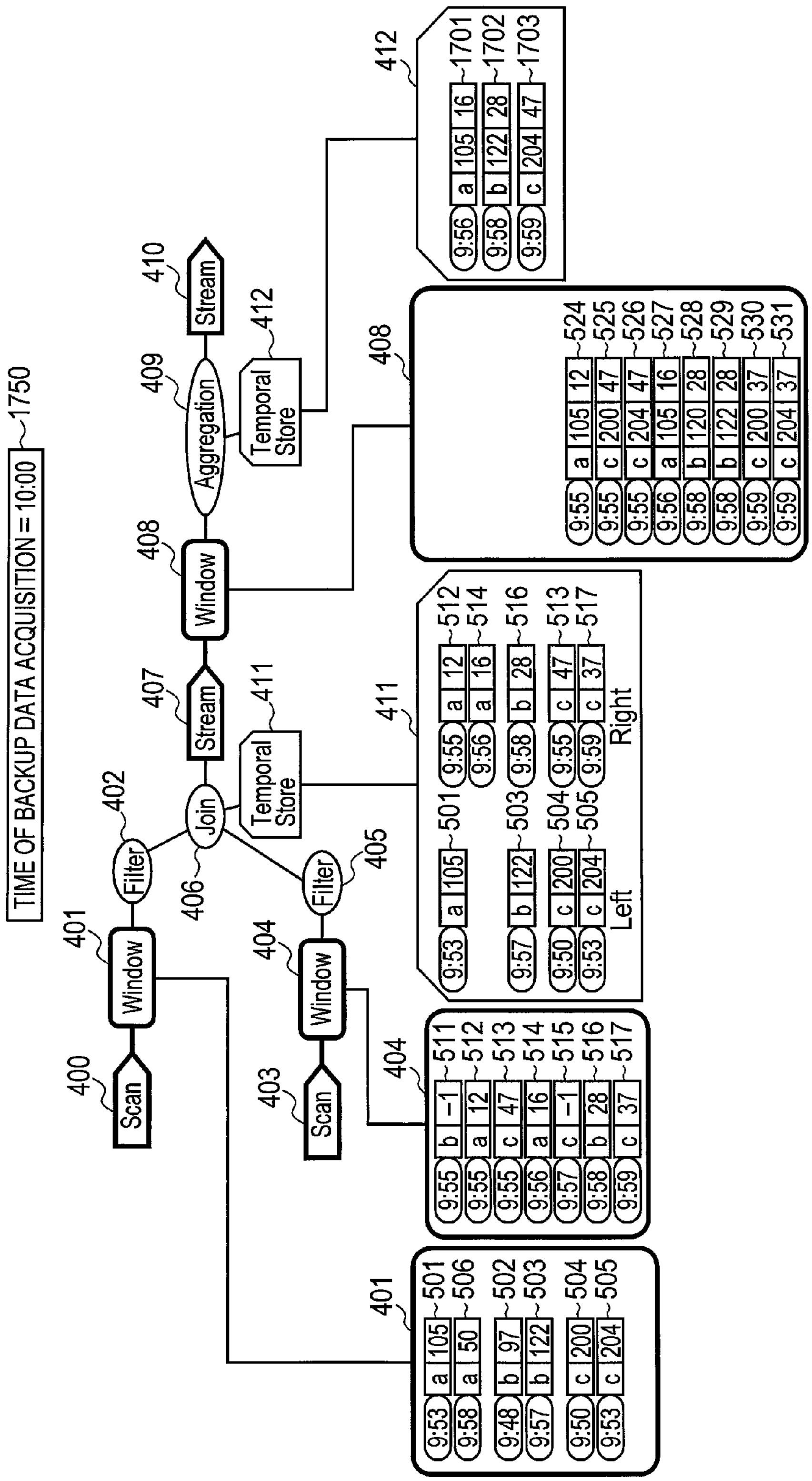
FIG. 17 is a view of an example of the running state after the input data is backed up according to the first embodiment.
Figure 18:
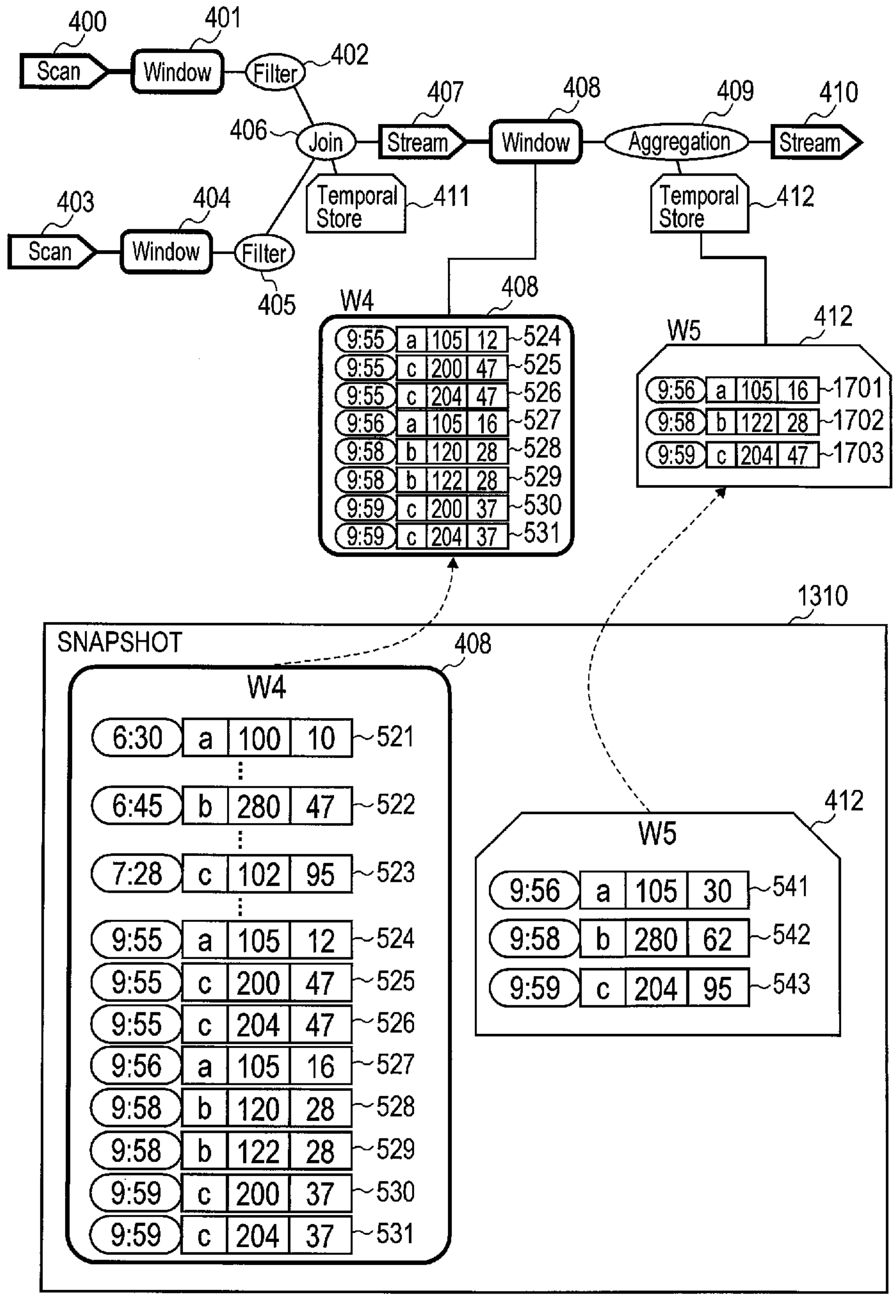
FIG. 18 is a view of an example of the operation for copying a snapshot after the input data is backed up according to the first embodiment.

FIGS. 16, 17, and 18 show examples of reproducing the running state at the time of the backup data acquisition based on the snapshot obtained in FIG. 13, by the procedure shown in the flow chart of FIG. 15, in the stream data processing system in the initial state.

In FIG. 16, the backup 1300 of the input data from the recovery point to the time of the backup data acquisition in step 1500 is input to the stream data processing system in the initial state.

FIG. 17 shows the results. In this case, the running state at 10:00, which is a backup data acquisition time 1750, is reproduced for three windows W1 401, W2 404, and W3 411 whose running states can be reproduced based on the backup of the input data. On the other hand, W4 408 essentially stores the data from 6:30 for which the amount of data from 9:48 is not sufficient. Further, W5 412 stores the maximum values of the data from 6:30, so that data pieces 1701 to 1703, which are the maximum values from 9:48, are different from the original data.

FIG. 18 shows an example of steps 1501 to 1504 that are applied to the state shown in FIG. 17. In this case, the running state of W4 408 and the running state of W5 412 are not reproducible with the backup data 1300 of the input data. Thus, their running states are copied from the snapshot 1310. As a result, the running state at the time of the backup data acquisition can be reproduced for all the operators including W4 408 and W5 412, in a similar way as in FIG. 9.

Then, as shown in step 1505, the backup of the input data after the backup data acquisition is processed to reproduce the running state just before the failure.

After that, the process of obtaining the snapshot can be periodically performed, or automatically performed when the amount of the backup of the input data reaches a certain value.

Figure 19:
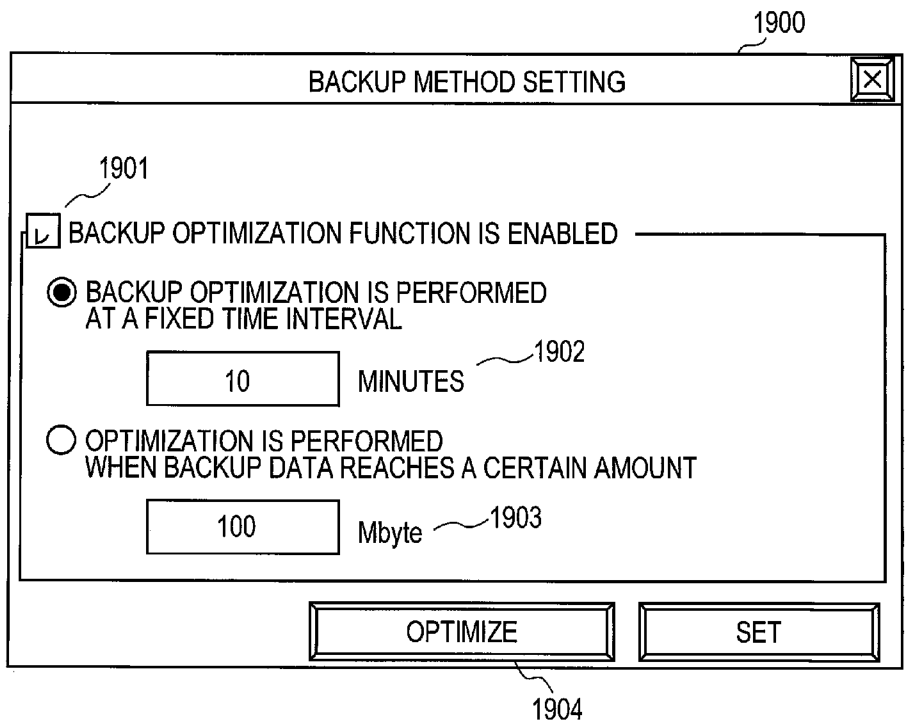
FIG. 19 is a view of an example of a GUI for setting parameters in the backup data acquisition according to the first embodiment.

Further, as shown in FIG. 19, it is possible to use a graphic user interface (GUI) 1900 to configure the settings: presence 1901 of the use of the optimization function of backup data acquisition, fixed interval 1902 of time, maximum capacity 1903 of backup data, and the like. Note that reference numeral 1094 denotes the "Optimize" button used by a user to perform optimization immediately at any desired time.

With the above-described process procedure according to the present invention, it is possible to achieve a method for reproducing the running state of the stream data processing system in the minimum record area.

Industrial Applicability

The present invention relates to a fault recovery technique for stream data processing. More particularly, the present invention is useful as a technique for storing reproduction data required for fault recovery.

LIST OF REFERENCE SIGNS

100: Stream processing server
101, 102, 103, 200, 210: Computer
104: Network
201, 211: CPU
202, 212: Memory
203, 213: Storage
204, 214: Network I/F
205, 215: Computer internal bus
206: Stream data processing system
216: Backup storage system (BSS)
217, 218: Backup data for recovery
400 to 410: Operator

411, 412: Buffer area
601: Input data receiving unit
602: Query execution unit
605: Output data transmission unit
606: Query analysis unit
608, 656: Snapshot subject list record area
609, 657: Replicated data communication unit
610: Recovery request transmission unit
611: Backup notification receiving unit
612, 660: Copy buffer area
613, 661: Work area data communication unit
652: Backup data management unit
655: Input data record area
658: Recovery request receiving unit
659: Backup notification transmission unit
621, 622, 623: Operator running state buffer area
624, 625, 626: Operator recovery point record area
671, 672, 673: Operator running state record area
501 to 506, 511 to 517, 521 to 531, 541 to 543, 1020 to 1023, 1030 to 1035, 1701 to 1703: Data
901, 911, 921, 931, 941: Snapshot storage amount
902, 912, 922, 932, 942: Recovery point
1300: Input data backup
1301: Snapshot data
1900: Backup method setting GUI

The invention claimed is:

1. A fault recovery method for stream data processing executed by a computer, the method comprising the steps of:

obtaining an amount of stream data, based on a recovery point of each of a plurality of operators holding a running state with respect to the plurality of operators constituting stream data processing, from an earliest time of an operator holding the running state having a recovery point after a particular recovery point, and obtaining an amount of replicated data of an operator holding the running state having a recovery point before the particular recovery point;

determining a recovery point where the sum of the amount of the stream data and the amount of the replicated data is the least at each of the recovery points; and recording the stream data and the replicated data at the determined recovery point.

2. The fault recovery method for data processing according to claim 1, wherein the amount of stream data is a number of data pieces of the stream data.

3. The fault recovery method for data processing according to claim 1, wherein the computer performs recording of the running state at any time, at a fixed time interval, or when a certain amount of input data is given from a previous record.

4. The fault recovery method for data processing according to claim 1, wherein the operator holding the running state is a time window, a number window, or a permanent window.

5. The fault recovery method for data processing according to claim 1,further comprising the steps of:

inputting, by the computer, the stream data from the determined recovery point;

overwriting, by the computer, data of the operator holding the running state for which the replicated data is stored with the replicated data; and after performing the steps of inputting and overwriting, the computer performs stream data processing.

6. A fault recovery system for stream data processing executed by a computer comprising a processing unit and a storage unit, wherein the processing unit of the computer includes:

a query analysis unit for analyzing a plurality of operators each holding a running state with respect to the plurality of operators performing stream data processing in response to a query, and for analyzing recovery points of each of the plurality of operators; and a backup data management unit for obtaining an amount of stream data at each of the recovery points analyzed, from an earliest time of an operator holding the running state having a recovery point after a particular recovery point, and an amount of replicated data of an operator holding the running state having a recovery point before the particular recovery point, to determine the recovery point where the sum of the amount of the stream data and the amount of the replicated data is the least at each of the recovery points;

wherein the fault recovery system stores the running state of the stream data processing in the storage unit at the determined recovery point.

7. The fault recovery system for data processing according to claim 6, wherein the amount of stream data is a number of data pieces of the stream data.

8. The fault recovery system for data processing according to claim 6, wherein the processing unit performs recording of the running state at any time, at a fixed time interval, or when a certain amount of input data is given from a previous record.

9. The fault recovery system for data processing according to claim 6, wherein the operator holding the running state is a time window, a number window, or a permanent window.

10. The fault recovery system for data processing according to claim 6, wherein, in running state reproduction for fault recovery inputting the stream data from the determined recovery point;

then overwrites of the operator holding the running state for which the replicated data is stored with the replicated data; and then performs stream data processing thereafter.

11. A non-transitory computer readable medium storing fault recovery program for data processing executed by a processing unit of a computer that performs stream data processing based on a query, wherein the program causes the processing unit to perform the steps of:

analyzing a plurality of operators holding a running state with respect to the plurality of operators performing stream data processing in response to a query, and analyzing recovery points of each of the plurality of operators;

obtaining an amount of the stream data at each of the analyzed recovery points, from an earliest time of an operator holding the running state having a recovery point after a particular recovery point, and an amount of replicated data of an operator holding the running state having a recovery point before the particular recovery point;

determining the recovery point where the sum of the amount of the stream data and the amount of the replicated data is the least at each of the recovery points; and recording the running state of the stream data processing at the determined recovery point.

12. The non-transitory computer readable medium according to claim 11, wherein the amount of stream data is a number of data pieces of the stream data.

13. The non-transitory computer readable medium according to claim 11, wherein the program causes the processing unit to perform recording of the running state at any time, at a fixed time interval, or when a certain amount of input data is given from a previous record.

14. The non-transitory computer readable medium according to claim 11, wherein the operator holding the running state is a time window, a number window, or a permanent window.

15. The non-transitory computer readable medium according to claim 11, wherein the program causes the processing unit to further perform the steps of: inputting the stream data from the determined recovery point;

overwriting data of the operator holding the running state for which the replicated data is stored with the replicated data; and performing stream data processing.

* * * * *